US011354695B1

(12) United States Patent
Sudul et al.

(10) Patent No.: US 11,354,695 B1
(45) Date of Patent: Jun. 7, 2022

(54) CONFIGURING PROMOTIONS FOR LOCAL PICKUP OF GOODS

(71) Applicant: Groupon, Inc., Chicago, IL (US)

(72) Inventors: Gareth Douglas Sudul, San Francisco, CA (US); Sharif Musa Sleiman, San Jose, CA (US); Eric David Radist, Chicago, IL (US); Puneet Shah, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 701 days.

(21) Appl. No.: 14/459,256

(22) Filed: Aug. 13, 2014

Related U.S. Application Data (60) Provisional application No. 61/866,026, filed on Aug. 14, 2013.

(51) Int. Cl.
| | | |
|---|---|---|
| *G06Q 30/00* | (2012.01) | |
| *G06Q 30/02* | (2012.01) | |
| *G06Q 30/06* | (2012.01) | |
| *G06Q 10/08* | (2012.01) | |

(52) U.S. Cl.
CPC ..... *G06Q 30/0223* (2013.01); *G06Q 10/0836* (2013.01); *G06Q 30/0613* (2013.01); *G06Q 30/0635* (2013.01); *G06Q 30/0643* (2013.01)

(58) Field of Classification Search
CPC .................................. G06Q 30/0207–0277
See application file for complete search history.

(56) References Cited

U.S. PATENT DOCUMENTS

| | | | | |
|---|---|---|---|---|
| 2002/0077937 | A1* | 6/2002 | Lyons | G06Q 10/087 705/28 |
| 2008/0059306 | A1* | 3/2008 | Fordyce | G06Q 30/02 705/14.27 |
| 2012/0173336 | A1 | 7/2012 | Strumolo | |
| 2012/0316963 | A1* | 12/2012 | Moshfeghi | G06Q 20/20 705/14.58 |
| 2013/0132179 | A1* | 5/2013 | Wu | G06Q 30/02 705/14.23 |
| 2013/0262336 | A1* | 10/2013 | Wan | G06Q 10/0836 705/339 |
| 2014/0101685 | A1 | 4/2014 | Kitts et al. | |

* cited by examiner

*Primary Examiner* — Kambiz Abdi
*Assistant Examiner* — Christopher Stroud
(74) *Attorney, Agent, or Firm* — Alston & Bird LLP (57) ABSTRACT

Embodiments of the present invention provide systems, methods and computer readable media for configuring promotions for local pickup of goods. One aspect of the subject matter can be embodied in methods that include the actions of receiving, from a device of a third-party provider of items, promotion data describing a promotion submission, the promotion data including a discounted price of each of a quantity of an item that is in stock and available for customer pickup at one or more of the third-party provider's brick-and-mortar locations; receiving, from a consumer device, consumer order data for purchase of the item as specified by the promotion submission, the consumer order data including a selection of one of the third-party's brick-and-mortar locations for pickup of the item; generating instrument data describing the item; and sending, to the consumer device, the instrument data in response to finalizing the consumer's purchase of the item.

33 Claims, 8 Drawing Sheets

CONFIGURING PROMOTIONS FOR LOCAL PICKUP OF GOODS

CROSS-REFERENCE TO RELATED APPLICATIONS

This application claims the benefit of U.S. Provisional Application No. 61/866,026, entitled "CONFIGURING PROMOTIONS FOR LOCAL PICKUP OF GOODS," and filed Aug. 14, 2013, the entire contents of which are hereby incorporated by reference.

FIELD

Embodiments of the invention relate, generally, to systems and methods for configuring promotions for local pickup of goods.

BACKGROUND

Current methods for configuring promotions for local pickup of goods exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media for configuring promotions for local pickup of goods.

In general, one aspect of the subject matter described in this specification can be embodied in methods that include the actions of receiving, from a device of a third-party provider of items, promotion data describing a particular promotion submission, the promotion data including a discounted price of each of a quantity of an item that is in stock and available for customer pickup at one or more of the third-party provider's brick-and-mortar locations; receiving, from a consumer device, consumer order data for purchase of the item as specified by the particular promotion submission, wherein the consumer order data includes a selection of one of the third-party's brick-and-mortar locations for pickup of the item; generating instrument data describing the item; and sending, to the consumer device, the instrument data in response to finalizing the consumer's purchase of the item as specified by the particular promotion submission. In embodiments, finalizing the consumer's purchase may include completing a purchase transaction for the consumer order data; and confirming the consumer order data with the third-party provider to enable pickup of the item from one of the brick-and-mortar locations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the terms "consumer" and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

Prior to launching a particular merchant's promotion for goods, a promotion and marketing service typically sources and warehouses a quantity of those goods from the merchant. When a consumer purchases the promoted goods in response to one of the promotion and marketing service's impressions, the promotion and marketing service completes the purchase by sending one or more of the quantity of warehoused goods to the consumer. For example, and using the running company promotion as an example, a promotion and marketing service will source and warehouse a particular quantity of pairs of running shoes from the running company prior to offering impressions of the running shoes promotion to consumers. When a consumer purchases running shoes in response to one of the impressions, the promotion and marketing service will extract the purchased running shoes from the warehoused inventory of running shoes and send them to the consumer.

A merchant's promotion for services (e.g., restaurant meals, spa services) is handled differently, because a consumer must travel to the merchant's location in order to receive the service. When a consumer purchases a promoted service, the promotion and marketing service completes the purchase by providing an instrument to the consumer that the consumer can then redeem at the merchant's location. The promotion and marketing service does not need to source, warehouse, and then manage the merchant's inventory as would be done for a promotion for goods. In some embodiments, a promotion and marketing service provides a merchant with direct access to service promotion attributes via a self-service portal.

As such, and according to some example embodiments, the systems and methods described herein are therefore configured to provide a digital storefront to merchants to enable configuration and management of promotions for goods that, once purchased, can be picked up at (or, additionally and/or alternatively, shipped from) one or more of the merchant's brick-and-mortar locations. For purposes of this specification and the appended claims, the term "brick-and-mortar location" refers to any physical location from which goods may be sold, distributed, or otherwise provided. Like the handling of promotions for services, the promotion and marketing service is not required to source and warehouse promoted goods for local pickup. In embodiments, the promotion and marketing service handles consumer purchase transactions, and the digital storefront enables direct communication between the merchant and the promotion and marketing service to optimize consumer order fulfillment. In embodiments, the digital storefront provides the merchant with access to promotion analytics collected by the promotion and marketing service, providing feedback that enables optimization of the performance of current and future promotions offered by the merchant.

Figure 1:
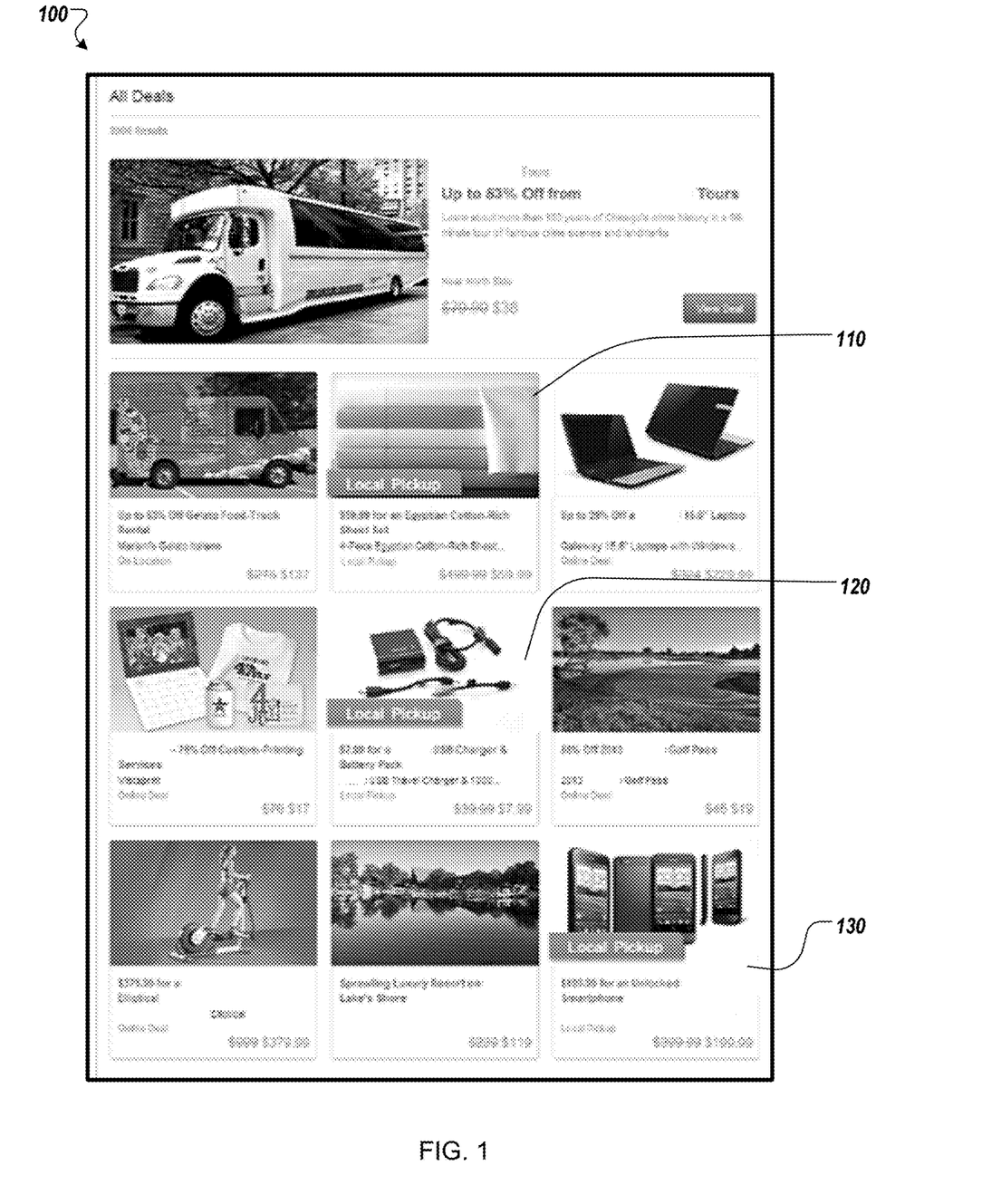
FIG. 1 shows a screen shot from an example interactive promotions display that may be rendered on a consumer device in accordance with some embodiments discussed herein.

FIG. 1 shows a screen shot from an example interactive promotions display 100 that may be rendered on a consumer device according to various embodiments of the invention. The display content includes a set of impressions, each representing a promotion for currently available items (goods and/or services) that are available for purchase from a promotion and marketing service. Each impression is a graphic icon that includes an overview description of the promotion terms, an interactive link that, when selected by the consumer, may navigate the consumer to a page in the promotion and marketing service's website that will include more details about the promoted item and/or purchasing details. Each impression also may include the promotion's terms for how a consumer receives the purchased items. For example, in some embodiments, goods purchased as "online deals" will be shipped from the promotion and marketing service to the consumer, and items purchased as "on location" will be sent by the promotion and marketing service as an instrument that the consumer will redeem at a provider's location.

The example display 100 includes three impressions (110, 120, and 130) that represent promotions for goods to be purchased for pickup at one of the provider's brick-and-mortar locations. In embodiments, this type of promotion is described as a "local pickup" promotion, and each of the impressions 110, 120, and 130 includes a "local pickup" badge that highlights the type of promotion being offered.

Figure 2:
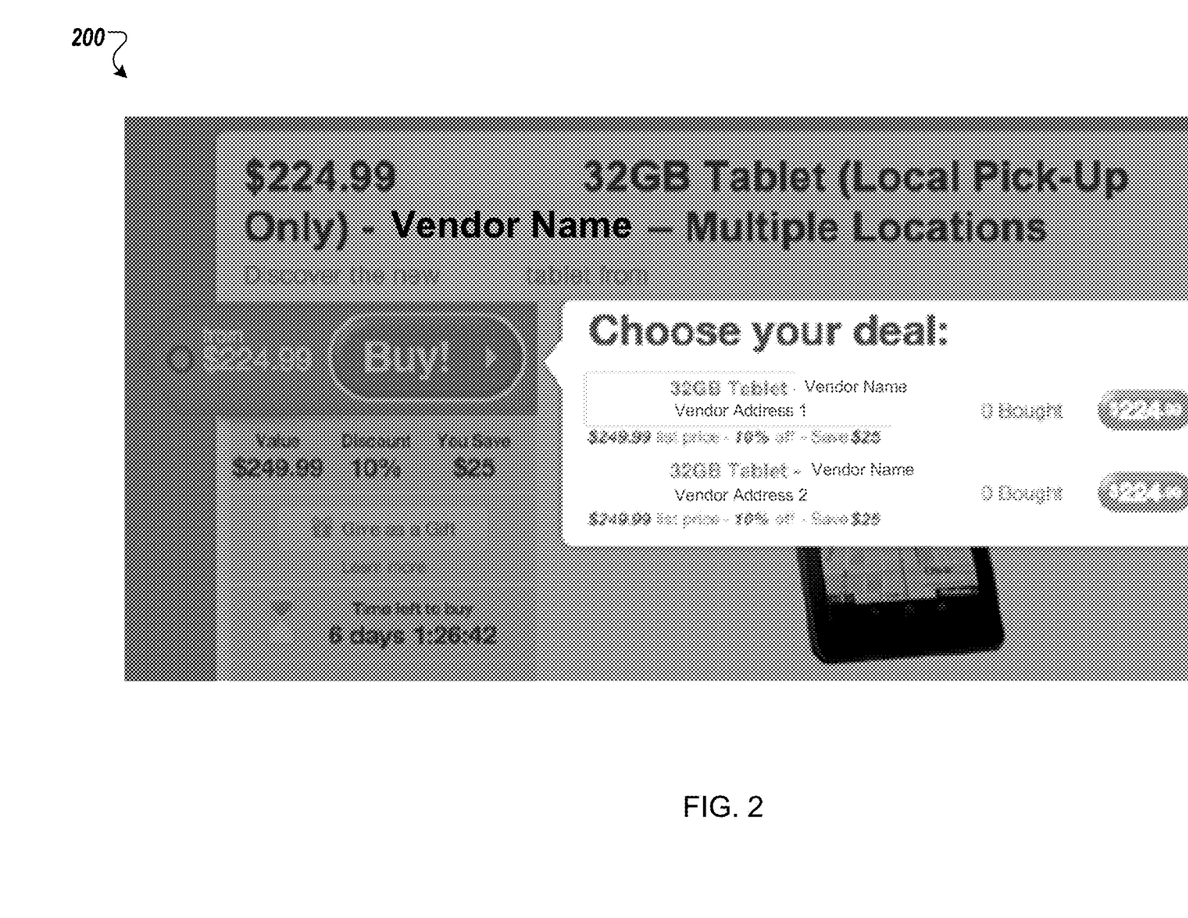
FIG. 2 shows a partial screen shot from a promotion and marketing service exemplary website page describing an item available for purchase through a local pickup promotion in accordance with some embodiments discussed herein.

FIG. 2 shows a partial screen shot 200 from a promotion and marketing service exemplary website page describing an item available for purchase through a local pickup promotion. The exemplary description includes data describing the current status of the provider's inventory at two brick-and mortar locations, enabling a consumer to browse the provider's inventory at multiple locations directly from the promotion and marketing service website.

In some embodiments, a promotion and marketing service integrates a supply-side management system to enable direct connections between the promotion and marketing service and the third-party provider community. This direct connection improves communication, and thus overall efficiency, in fulfilling consumer orders of promoted goods, such as, for example, scheduling shipments to be picked up at a provider's retail brick-and-mortar location, tracking trucks from a provider's warehouse to the provider's retail brick-and-mortar location, and facilitating a provider's confirmation of consumer orders for promoted goods.

In some embodiments, the integration of a supply-side management system further includes a direct connection between the financial systems of the promotion and marketing service and a third-party provider. This connection enables automation of financial transactions for improved efficiency (e.g., promotion and marketing service purchase order satisfaction can be automated for rapid scheduling of third-party provider invoices for payment).

In some embodiments, the integrated supply-side management system may enable a promotion and marketing service to uncover inventory distributed among its partner retailers. For example, in embodiments, the integrated supply-side management system may be used to survey available inventory at partner retailers; pro-actively structure a potential promotion based on inventory located at one or more merchants and notify those merchants of the proposed promotion to allow them to opt-in; and monitor inventory status over the life of a featured promotion.

Figure 3:
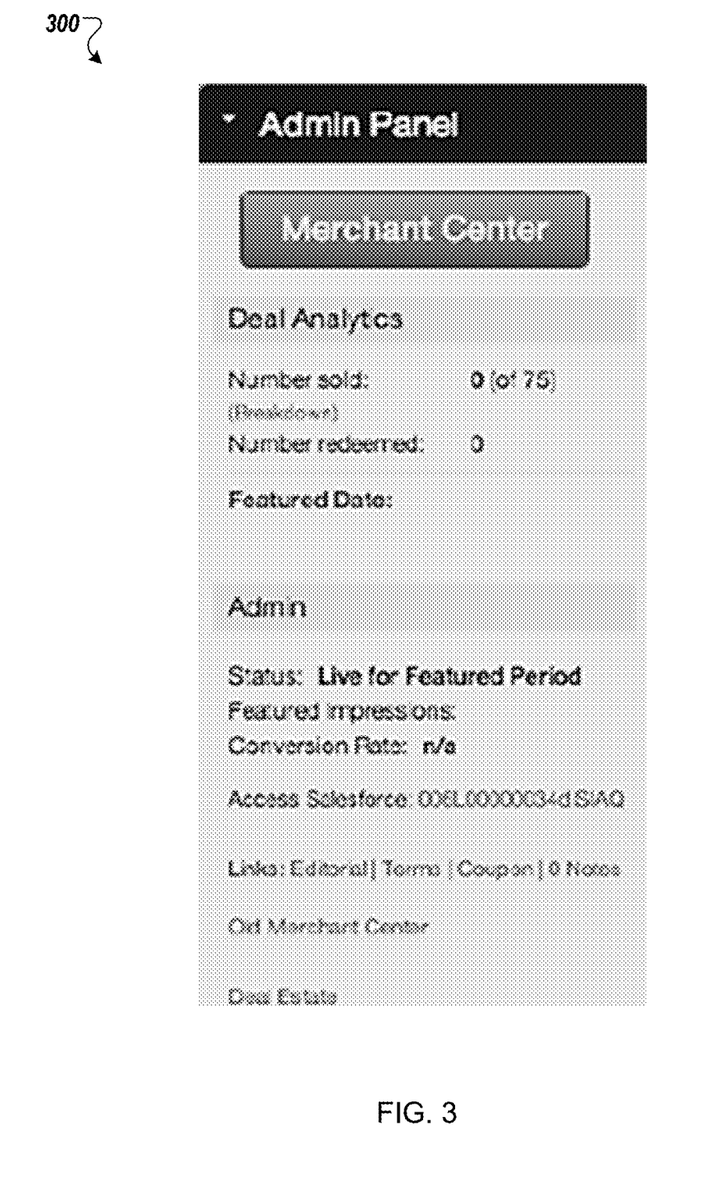
FIG. 3 shows a partial screen shot of an exemplary provider "merchant center" administration panel display in accordance with some embodiments discussed herein.

FIG. 3 shows a partial screen shot 300 of an exemplary provider "merchant center" administration panel display. In some embodiments, this display may be included in the content of a promotion and marketing service exemplary website page describing an item available for purchase through a local pickup promotion, and be accessed by the third-party provider offering the promotion after authentication. For example, in some embodiments, the website may authenticate a third-party provider based on a cookie included in the provider's request to access the website page.

In embodiments, a promotion and marketing service may provide a third-party provider with direct access to a self-service portal that provides a digital storefront through which the provider may receive notice of orders from consumers of promoted goods, access promotion data and attributes, input promotion submissions, and track promotion performance.

In embodiments, a third-party provider may access the self-service portal to define the terms of a particular promotion submission (e.g., how many items are to be offered, the length of the promotion, the amount of the discount). In some embodiments, the terms may include allocating inventory distribution among multiple brick-and-mortar sites. In some embodiments, a provider may define different pricing to be offered at some or all of the multiple brick-and-mortar sites based on, for example, amount of inventory available at each site and/or consumer demographics.

In embodiments, a third-party provider also may use the self-service portal to access promotion analytics. Thus, a third-party provider may be able to track performance of the promotion during the time period within which the promotion is being offered (e.g., access consumer redemption patterns). In some embodiments, a provider may be able to adjust inventory distribution and/or pricing dynamically based on those analytics. For example, if inventory is selling more quickly at one brick-and-mortar location, a provider may decide to move inventory from other locations where it is not selling so quickly and/or offer more of an incentive (e.g., a larger discount) at the locations where the inventory is not selling as quickly. Such decisions by the provider may be instantly communicated to consumers being offered the promotion through content describing pricing offered at each brick-and-mortar location, such as is illustrated in partial screen shot 200.

In embodiments, promotion analytics directly accessible to third-party providers through the portal may include performance data collected by the promotion and marketing service. This performance data may include data collected by the promotion and marketing service that describe consumer behavior in response to the promotion's impressions (e.g., impression conversion rates during the promotion featured period, impression conversion rates based on past behavior of consumers in response to previous impressions, conversion rates based on consumer demographics). In some embodiments, a third-party provider and the promotion and marketing service may use this performance data as the basis for target marketing and/or definition of promotion attributes that will improve the performance of future promotions. In some embodiments, a promotion and marketing service may leverage geo-fencing for promotions to identify, through consumer profile data, consumers located within the vicinity of the brick-and-mortar locations and then alert those customers about a third-party provider's promotion.

In some embodiments, a local pickup promotion for a particular item may be offered for purchase at brick-and-mortar locations belonging to multiple third-party providers. The promotion attributes and pricing may be defined by the multiple providers through the self-service portal, with each provider being able to adjust pricing and inventory distribution at their own brick-and-mortar locations based on the promotion analytics. In this way, a group of smaller providers can pool inventories to approach the competitive advantages of large inventories of, for example, big box merchants.

In some embodiments, a local pickup promotion for a particular item may be offered by the item's manufacturer (e.g., a manufacturer of a CPG (consumer packaged goods) item) to promote the item across multiple non-related retailers using the promotion and marketing service. For example, in some embodiments, a manufacturer may pay the promotion and marketing service a co-op marketing fee to feature their product, and the promotion and marketing service may structure a promotion to enable any retailers that currently stock the product to opt in to be part of the promotion.

Figure 4:
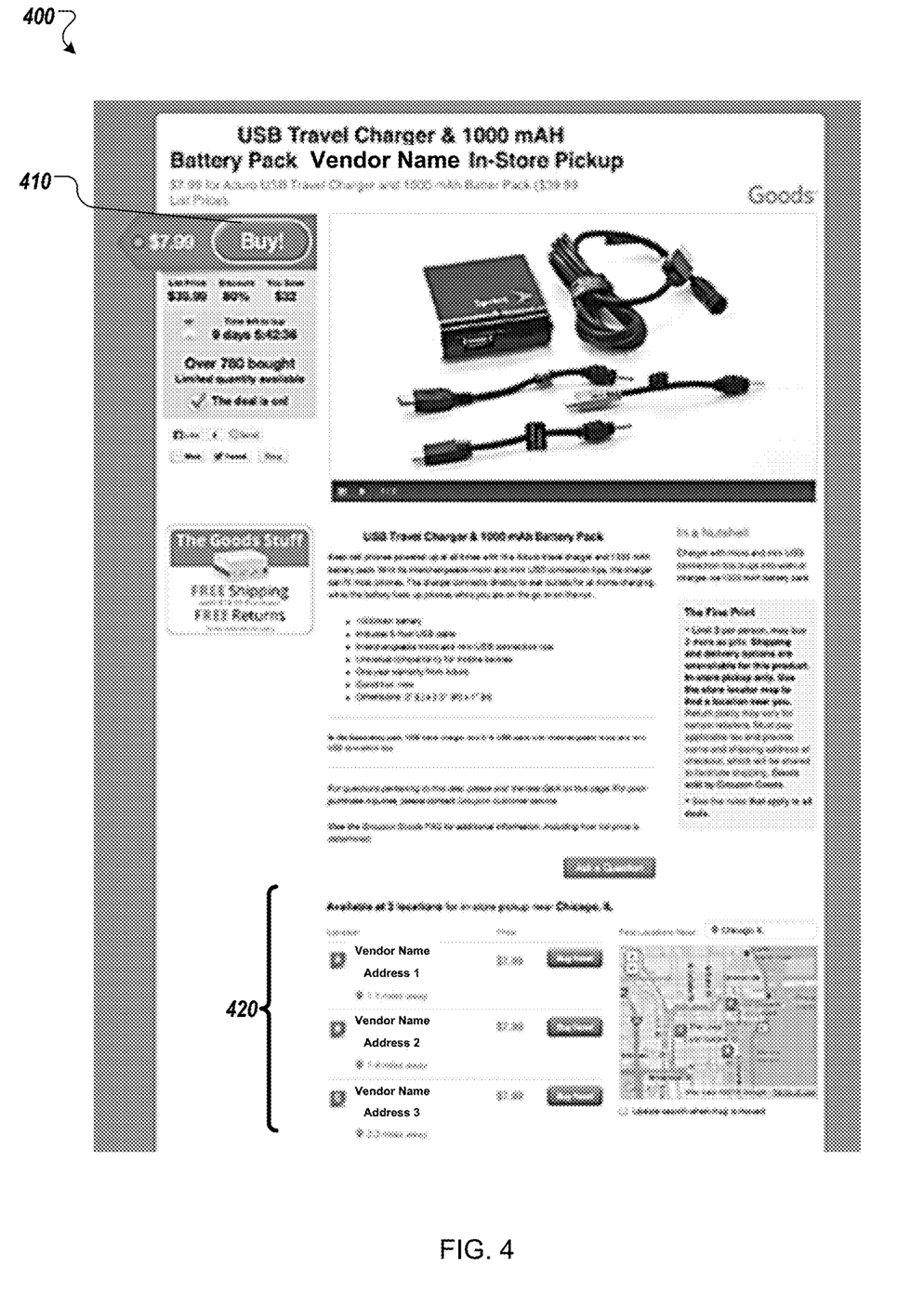
FIG. 4 shows a partial screen shot from a promotion and marketing service exemplary website page describing an item available for purchase through a local pickup promotion as well as location choices for local pickup of the item after purchase in accordance with some embodiments discussed herein.

FIG. 4 shows a partial screen shot 400 from a promotion and marketing service exemplary website page describing an item available for purchase through a local pickup promotion as well as location choices for local pickup of the item after purchase.

In embodiments, the website page content may include alternative widgets through which a consumer may indicate a decision to finalize purchase of the item. For example, the content may include a "buy button" widget 410 which, when selected, will provide a description of the locations and pricing at the third-party provider's brick-and-mortar stores. Additionally and/or alternatively, the website page may include a location selection pane 420 with vendor location data and contact information as well as pricing, with each location including a selection button for finalizing a purchase for pickup at that location.

In some embodiments, the location selection pane additionally or alternatively may describe shipping information to enable a consumer to select an item from a brick-and-mortar location that can be delivered and/or shipped to the consumer's location. In some embodiments, a consumer may be offered a selection of delivery options that include same-day delivery and regular mail delivery. In some embodiments, the instrument data describing a consumer's selection of same-day delivery may include consumer location information derived from the consumer's static address determined from the consumer's profile data maintained by the promotion and marketing service and/or the consumer's location determined from a GPS-enabled mobile consumer device.

Figure 5:
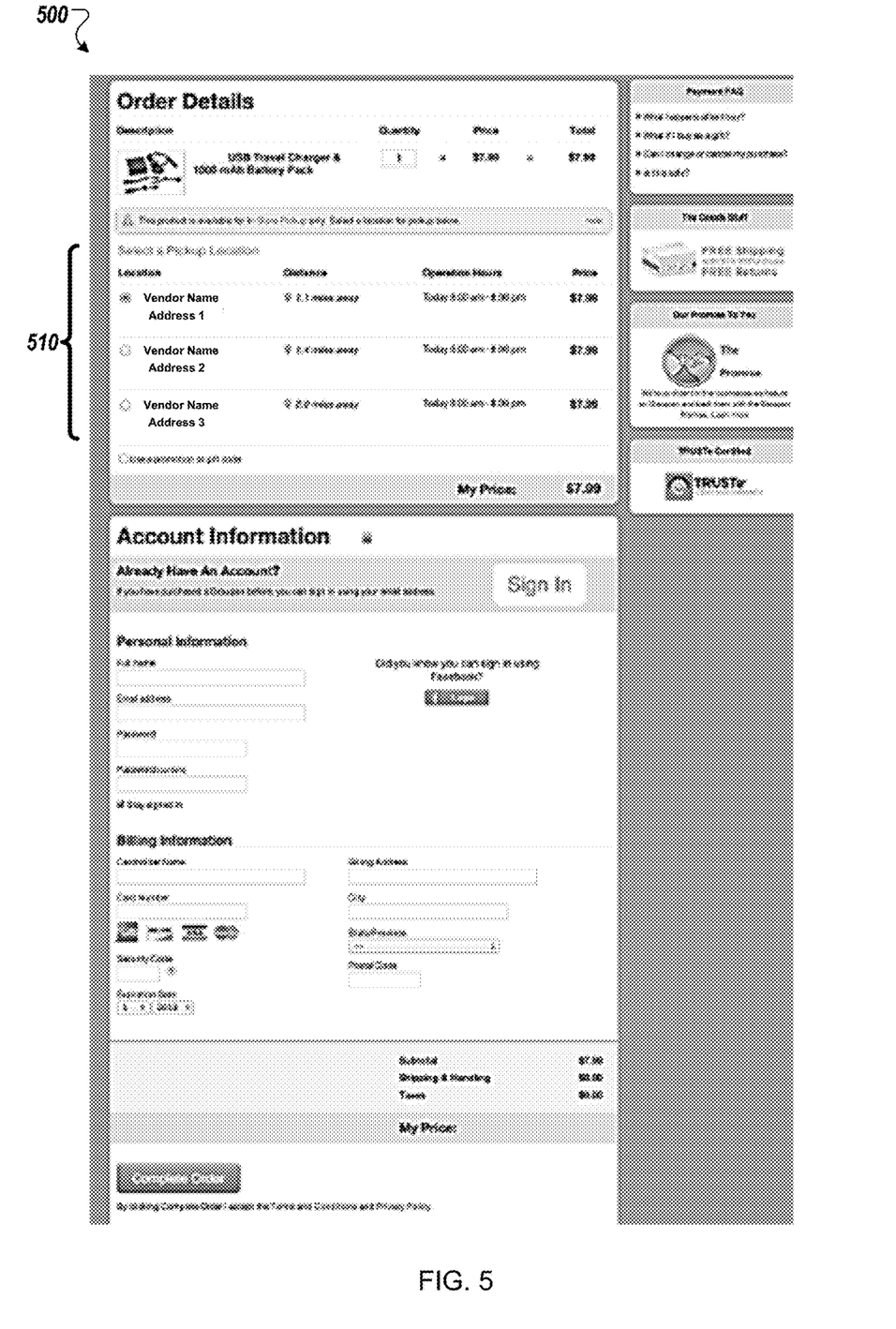
FIG. 5 shows a partial screen shot from a promotion and marketing service exemplary website page displaying order finalization content data for an item to be purchased from a local pickup promotion in accordance with some embodiments discussed herein.

FIG. 5 shows a partial screen shot 500 from a promotion and marketing service exemplary website page displaying order finalization content data for an item to be purchased from a local pickup promotion. In some embodiments, this order finalization content data may be displayed to a consumer in response to receiving the consumer's selection of a buy button 410 or a location purchase selection button from a location selection pane 420, as illustrated in partial screen shot 400.

The order finalization content includes an interactive pickup selection pane 510. The pane 510 summarizes the available locations for item pickup, and also provides radio button widgets so that the consumer may adjust the selection before the order is finalized.

The order finalization content also includes an account information pane. In embodiments, the promotion and marketing service processes the purchase transaction and manages the consumer's promotions purchasing account which, for example, includes verifying the consumer's credit information and method of payment. Once the purchase transaction is finalized, in embodiments, a promotion and marketing service directly will notify the third-party provider that is offering the promotion that the item has been ordered for pickup for a particular brick-and-mortar location. In embodiments, the third-party provider confirms the order by confirming that the item is in stock and available for pickup at the particular location. In some embodiments, order confirmation is implemented through interfaces to the promotion and marketing service's supply-side management system.

Figure 6:
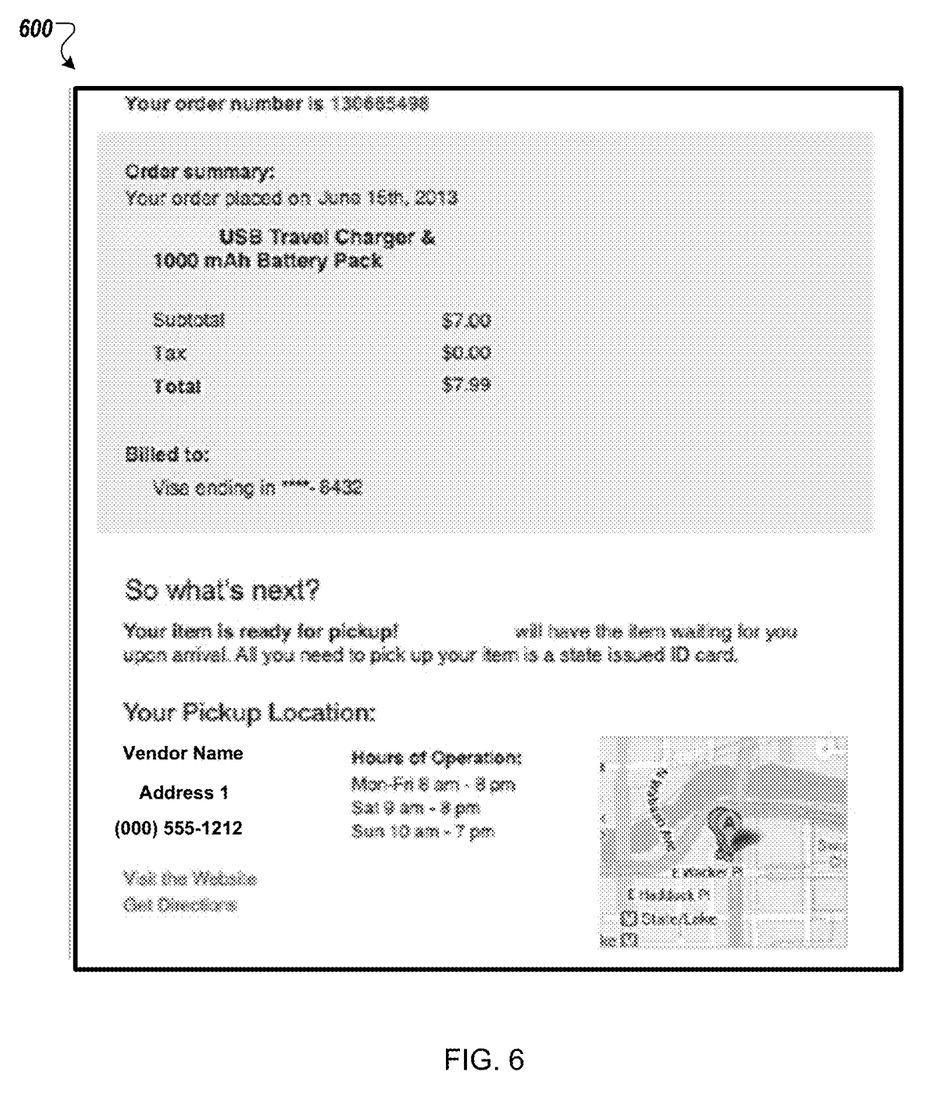
FIG. 6 shows a partial screen shot from a promotion and marketing service exemplary website page displaying order summary content data describing a finalized purchase of an item from a local pickup promotion in accordance with some embodiments discussed herein.

FIG. 6 shows a partial screen shot 600 from a promotion and marketing service exemplary website page displaying order summary content data describing a finalized purchase of an item from a local pickup promotion. The order summary content data includes the purchase summary as well as provides a summary of contact information the pickup location where the item's availability has been confirmed.

Figure 7:
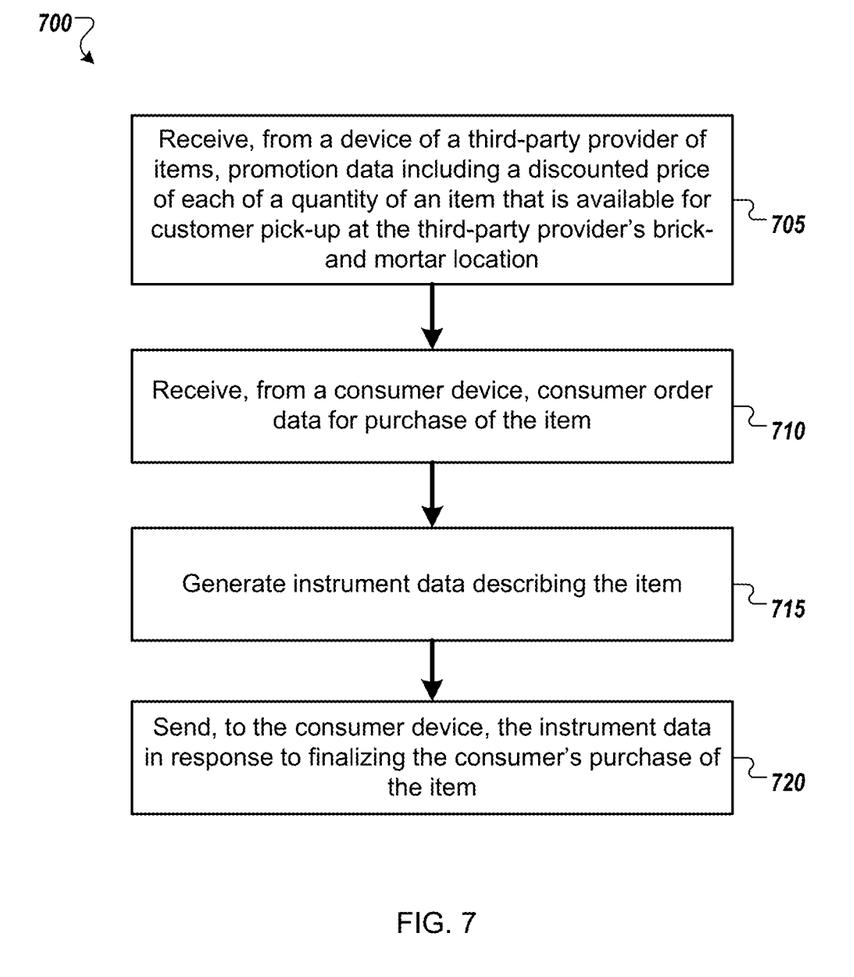
FIG. 7 is a flow diagram of an example method for providing a digital storefront service in accordance with some embodiments discussed herein.

FIG. 7 is a flow diagram of an example method 700 for providing a digital storefront service. For convenience, the method will be described with reference to a system that includes one or more computers and performs the method 700.

In embodiments, the system receives, at 705, promotion data describing a promotion submission. In embodiments, the data may include a discounted price of each of a quantity of an item that is in stock and available for customer pickup at one or more of a third-party provider's brick-and-mortar locations. In some embodiments, the system receives the submission directly from a third-party provider device via an interface provided by a provider self-service portal, as previously described.

In embodiments, the system receives, at 710, consumer order data for purchase of the item. In some embodiments, the consumer order data is received in response to consumer inputs to a display on the consumer's device of a promotion and marketing service website page describing the item available for purchase through a local pickup promotion, as described with reference to FIG. 2 and FIG. 4.

In embodiments, the system generates, at 715, instrument data describing the consumer order. In some embodiments, the generated instrument data includes location data describing the brick-and-mortar location selected by the consumer for local pickup, as described with reference to FIG. 5, as well as account information (e.g., credit card information, method of purchase) for the consumer who has placed the order.

As previously described with reference to FIG. 5, in embodiments, the system uses the generated instrument data to finalize the consumer's purchase by completing the consumer's purchase transaction and confirming, with the third-party provider, that the ordered item is in stock and available for pickup at the brick-and-mortar location selected by the consumer. Once the order is finalized, the system, at 720, sends the instrument data to the consumer. In embodiments, this data may be included in order summary content that is displayed to the consumer as described with reference to FIG. 6.

Figure 8:
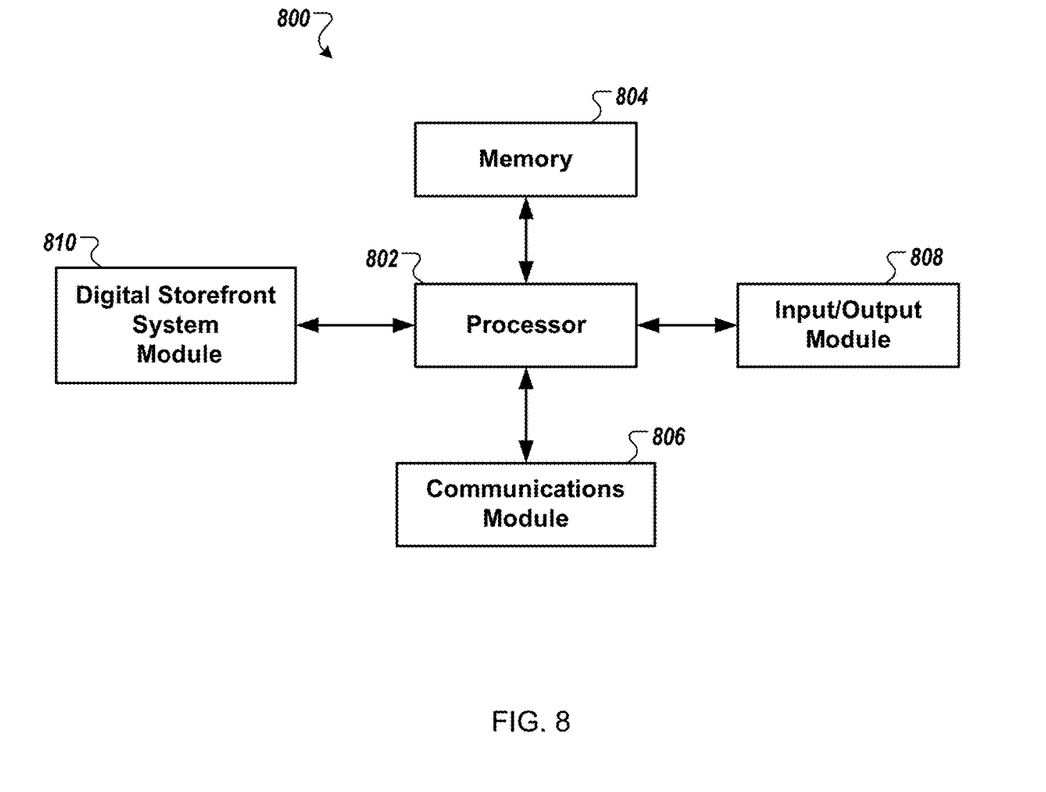
FIG. 8 illustrates a schematic block diagram of circuitry that can be included in a computing device, such as a digital storefront service module, in accordance with some embodiments discussed herein.

FIG. 8 shows a schematic block diagram of circuitry 800, some or all of which may be included in, for example, a digital storefront system. As illustrated in FIG. 8, in accordance with some example embodiments, circuitry 800 can include various means, such as processor 802, memory 804, communications module 806, and/or input/output module 808. As referred to herein, "module" includes hardware, software and/or firmware configured to perform one or more particular functions. In this regard, the means of circuitry 800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 804) that is executable by a suitably configured processing device (e.g., processor 802), or some combination thereof.

Processor 802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 8 as a single processor, in some embodiments processor 802 comprises a plurality of processors. The plurality of processors may be embodied on a single computing device or may be distributed across a plurality of computing devices collectively configured to function as circuitry 800. The plurality of processors may be in operative communication with each other and may be collectively configured to perform one or more functionalities of circuitry 800 as described herein. In an example embodiment, processor 802 is configured to execute instructions stored in memory 804 or otherwise accessible to processor 802. These instructions, when executed by processor 802, may cause circuitry 800 to perform one or more of the functionalities of circuitry 800 as described herein.

Whether configured by hardware, firmware/software methods, or by a combination thereof, processor 802 may comprise an entity capable of performing operations according to embodiments of the present invention while configured accordingly. Thus, for example, when processor 802 is embodied as an ASIC, FPGA or the like, processor 802 may comprise specifically configured hardware for conducting one or more operations described herein. Alternatively, as another example, when processor 802 is embodied as an executor of instructions, such as may be stored in memory 804, the instructions may specifically configure processor 802 to perform one or more algorithms and operations described herein, such as those discussed in connection with FIG. 7.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing device or distributed across a plurality of computing devices. In various embodiments, memory 804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 804 may be configured to store information, data (including analytics data), applications, instructions, or the like for enabling circuitry 800 to carry out various functions in accordance with example embodiments of the present invention. For example, in at least some embodiments, memory 804 is configured to buffer input data for processing by processor 802. Additionally or alternatively, in at least some embodiments, memory 804 is configured to store program instructions for execution by processor 802. Memory 804 may store information in the form of static and/or dynamic information. This stored information may be stored and/or used by circuitry 800 during the course of performing its functionalities.

Communications module 806 may be embodied as any device or means embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, a second circuitry 800 and/or the like. In some embodiments, communications module 806 (like other components discussed herein) can be at least partially embodied as or otherwise controlled by processor 802. In this regard, communications module 806 may be in communication with processor 802, such as via a bus. Communications module 806 may include, for example, an antenna, a transmitter, a receiver, a transceiver, network interface card and/or supporting hardware and/or firmware/software for enabling communications with another computing device.

Communications module 806 may be configured to receive and/or transmit any data that may be stored by memory 804 using any protocol that may be used for communications between computing devices. Communications module 806 may additionally or alternatively be in communication with the memory 804, input/output module 808 and/or any other component of circuitry 800, such as via a bus.

Input/output module 808 may be in communication with processor 802 to receive an indication of a user input and/or to provide an audible, visual, mechanical, or other output to a user. Some example visual outputs that may be provided to a user by circuitry 800 are discussed in connection with FIGS. 1-6. As such, input/output module 808 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 800 is embodied as a server or database, aspects of input/output module 808 may be reduced as compared to embodiments where circuitry 800 is implemented as an end-user machine or other type of device designed for complex user interactions. In some embodiments (like other components discussed herein), input/output module 808 may even be eliminated from circuitry 800. Alternatively, such as in embodiments wherein circuitry 800 is embodied as a server or database, at least some aspects of input/output module 808 may be embodied on an apparatus used by a user that is in communication with circuitry 800, such as for example, pharmacy terminal 108. Input/output module 808 may be in communication with the memory 804, communications module 806, and/or any other component(s), such as via a bus. Although more than one input/output module and/or other component can be included in circuitry 800, only one is shown in FIG. 8 to avoid overcomplicating the drawing (like the other components discussed herein).

Digital storefront service module 810 may also or instead be included and configured to perform the functionality discussed herein related to the digital storefront system discussed above. In some embodiments, some or all of the functionality of digital storefront system may be performed by processor 802. In this regard, the example processes and algorithms discussed herein can be performed by at least one processor 802 and/or digital storefront service module 810. For example, non-transitory computer readable media can be configured to store firmware, one or more application programs, and/or other software, which include instructions and other computer-readable program code portions that can be executed to control each processor (e.g., processor 802 and/or digital storefront service module 810) of the components of circuitry 800 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a digital storefront system. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 802 and/or digital storefront service module 810 discussed above with reference to FIG. 8, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 804) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for providing a digital storefront service, the method comprising:
retrieving, using a processor and from a repository, data describing available inventory of items at one or more brick-and-mortar locations of a third-party provider of the items, wherein a brick-and-mortar location is a physical location where the items are sold;
generating, using the processor, an interactive third-party electronic interface configured to facilitate creation of promotion data that defines a potential promotion based on instant inventory decision data provided via the interactive third-party electronic interface;
transmitting, using the processor, the interactive third-party electronic interface to the third-party provider device;
transmitting, using the processor, computer-executable instructions to the third-party provider device, the computer-executable instructions configured to provide a visual representation of the items for use in the potential promotion, and the computer-executable instructions further configured to provide a digital storefront portal via the interactive third-party electronic interface to allow creation of the promotion data;

receiving, using the processor and via the interactive third-party electronic interface of the third-party provider device, the promotion data, wherein the promotion data includes a price and a quantity of an item that is in stock and available for customer pickup at the one or more brick-and-mortar locations of the third-party provider;

generating, using the processor, an impression of the potential promotion based on the promotion data, the impression being an indication of the potential promotion and configured to enable purchase of the potential promotion, the potential promotion being an indication of a promotional value that upon purchase or acceptance results in issuance of an instrument that is used toward at least a portion of one of a purchase, acquisition, procurement, or consumption of one of goods, services, and experiences defined by the potential promotion;

obtaining, using the processor, real-time global positioning system (GPS) location data from a plurality of consumer devices;

monitoring, using the processor, a change in the real-time GPS location data associated with the plurality of consumer devices over a period of time;

in response to determining, based on the monitoring of the change in the real-time GPS location data, that at least one real-time GPS location for at least one consumer device of the plurality of consumer devices is within a certain distance of at least one brick-and-mortar location from the one or more brick-and-mortar locations, transmitting, using the processor and to the at least one consumer device of the plurality of consumer devices identified based on the real-time GPS location data and a geo-fencing technique, an electronic communication configured to render an interactive promotions electronic interface for the impression, wherein the electronic communication is generated based on the real-time GPS location data and the geo-fencing technique, wherein the interactive promotions electronic interface comprises a first interactive graphic icon associated with the impression configured to initiate generation of a modified version of the interactive promotions electronic interface that comprises at least a portion of the promotion data provided via the interactive third-party electronic interface of the third-party provider device, and wherein the interactive promotions electronic interface comprises a second interactive graphic icon associated with the impression configured to initiate purchase of the item specified by the impression in response to an electronic interface action performed with respect to the second interactive graphic icon;

receiving, using the processor and in response to the electronic interface action performed with respect to the second interactive graphic icon, consumer order data for the purchase of the item as specified by the impression, wherein the consumer order data includes a selection of one of the brick-and-mortar locations of the third-party for pickup of the item;

generating instrument data, using the processor that is independent from the third-party provider device, the instrument data describing the item; and transmitting, using the processor and to the consumer device, the instrument data in response to finalizing a purchase of the item as specified by the impression, and wherein finalizing the purchase of the item comprises:

executing, using the processor, a purchase transaction using the consumer order data, wherein executing the purchase transaction comprises determining, using the processor, purchase transaction data;

receiving, using the processor, confirmation of the consumer order data from the third-party provider to enable pickup of the item from one of the brick-and-mortar locations;

generating, using the processor, purchase summary content describing the finalized purchase of the item, wherein the purchase summary content comprises pickup location data describing the brick-and-mortar location, the pickup location data comprising at least one of address, contact information, location map, and hours of operation for the brick-and-mortar location; and transmitting, using the processor, the purchase summary content to an electronic interface of the consumer device, wherein the purchase summary content is configured to render a visual representation related to at least one of the address, the contact information, the location map, or the hours of operation for the brick-and-mortar location associated with the item as specified by the impression previously transmitted to the consumer device based on the real-time GPS location data.

2. The method of claim 1, wherein the consumer order data for purchase of the item is selected from a promotion offerings display that is rendered on the consumer device, and wherein the promotion offerings display comprises promotions content.

3. The method of claim 2, wherein the promotions content comprises an icon representing the item being offered for purchase.

4. The method of claim 3, wherein the icon comprises a graphic representing a link to digital content describing the item for purchase as specified by the impression.

5. The method of claim 1, wherein finalizing the purchase of the item further comprises:

transmitting, using the processor, an order confirmation notification to the third-party provider device, wherein the order confirmation notification comprises the brick-and-mortar location for pickup of the item; and receiving, using the processor, the confirmation of the consumer order data from the third-party provider device, wherein the received confirmation includes a confirmation from the third-party provider device that the item is available for pickup from the brick-and-mortar location.

6. The method of claim 1, wherein the receiving of the promotion data from the third-party provider device is from a merchant center portal that is configured for access by a plurality of different third-party provider devices, and wherein the third-party provider device is one of the plurality of different third-party provider devices.

7. The method of claim 6, wherein the promotion data received by the third-party provider device are based on marketing data received by the third-party provider device via the merchant center portal.

8. The method of claim 7, wherein the promotion data further comprises target marketing data describing attributes of consumers to be offered the promotion, wherein the target marketing data are derived from the marketing data.

9. The method of claim 6, wherein the confirming of the consumer order data is via the merchant center portal.

10. The method of claim 1, wherein the third-party provider is a national retailer.

11. The method of claim 1, wherein the third-party provider is a point of sale (POS) retailer.

12. A computer program product, stored on a non-transitory computer readable medium, comprising instructions that when executed on one or more computers cause the one or more computers to perform operations implementing providing a digital storefront service, the operations comprising:

retrieving, using a processor and from a repository, data describing available inventory of items at one or more brick-and-mortar locations of a third-party provider of the items, wherein a brick-and-mortar location is a physical location where the items are sold;

generating, using the processor, an interactive third-party electronic interface configured to facilitate creation of promotion data that defines a potential promotion based on instant inventory decision data provided via the interactive third-party electronic interface;

transmitting, using the processor, the interactive third-party electronic interface to the third-party provider device;

transmitting, using the processor, computer-executable instructions to the third-party provider device, the computer-executable instructions configured to provide a visual representation of the items for use in the potential promotion, and the computer-executable instructions further configured to provide a digital storefront portal via the interactive third-party electronic interface to allow creation of the promotion data;

receiving, using the processor and via the interactive third-party electronic interface of the third-party provider device, the promotion data, wherein the promotion data includes a price and a quantity of an item that is in stock and available for customer pickup at the one or more brick-and-mortar locations of the third-party provider;

generating, using the processor, an impression of the potential promotion based on the promotion data, the impression being an indication of the potential promotion and configured to enable purchase of the potential promotion, the potential promotion being an indication of a promotional value that upon purchase or acceptance results in issuance of an instrument that is used toward at least a portion of one of a purchase, acquisition, procurement, or consumption of one of goods, services, and experiences defined by the potential promotion;

obtaining, using the processor, real-time global positioning system (GPS) location data from a plurality of consumer devices;

monitoring, using the processor, a change in the real-time GPS location data associated with the plurality of consumer devices over a period of time;

in response to determining, based on the monitoring of the change in the real-time GPS location data, that at least one real-time GPS location for at least one consumer device of the plurality of consumer devices is within a certain distance of at least one brick-and-mortar location from the one or more brick-and-mortar locations, transmitting, using the processor and to the at least one consumer device of the plurality of consumer devices identified based on the real-time GPS location data and a geo-fencing technique, an electronic communication configured to render an interactive promotions electronic interface for the impression, wherein the electronic communication is generated based on the real-time GPS location data and the geo-fencing technique, wherein the interactive promotions electronic interface comprises a first interactive graphic icon associated with the impression configured to initiate generation of a modified version of the interactive promotions electronic interface that comprises at least a portion of the promotion data provided via the interactive third-party electronic interface of the third-party provider device, and wherein the interactive promotions electronic interface comprises a second interactive graphic icon associated with the impression configured to initiate purchase of the item specified by the impression in response to an electronic interface action performed with respect to the second interactive graphic icon;

receiving, using the processor and in response to the electronic interface action performed with respect to the second interactive graphic icon, consumer order data for the purchase of the item as specified by the impression, wherein the consumer order data includes a selection of one of the brick-and-mortar locations of the third-party for pickup of the item;

generating instrument data, using the processor that is independent from the third-party provider device, the instrument data describing the item; and transmitting, using the processor and to the consumer device, the instrument data in response to finalizing a purchase of the item as specified by the impression and wherein finalizing the purchase of the item comprises:

executing, using the processor, a purchase transaction using the consumer order data, wherein executing the purchase transaction comprises determining, using the processor, purchase transaction data;

receiving, using the processor, confirmation of the consumer order data from the third-party provider to enable pickup of the item from one of the brick-and-mortar locations;

generating, using the processor, purchase summary content describing the finalized purchase of the item, wherein the purchase summary content comprises pickup location data describing the brick-and-mortar location, the pickup location data comprising at least one of address, contact information, location map, and hours of operation for the brick-and-mortar location; and transmitting, using the processor, the purchase summary content to an electronic interface of the consumer device, wherein the purchase summary content is configured to render a visual representation related to at least one of the address, the contact information, the location map, or the hours of operation for the brick-and-mortar location associated with the item as specified by the impression previously transmitted to the consumer device based on the real-time GPS location data.

13. The computer program product of claim 12, wherein the consumer order data for purchase of the item is selected from a promotion offerings display that is rendered on the consumer device, and wherein the promotion offerings display comprises promotions content.

14. The computer program product of claim 13, wherein the promotions content comprises an icon representing the item being offered for purchase.

15. The computer program product of claim 14, wherein the icon comprises a graphic representing a link to digital content describing the item for purchase as specified by the impression.

16. The computer program product of claim 12, wherein finalizing the purchase of the item further comprises:
   transmitting, using the processor, an order confirmation notification to the third-party provider device, wherein the order confirmation notification comprises the brick-and-mortar location for pickup of the item; and
   receiving, using the processor, the confirmation of the consumer order data from the third-party provider device, wherein the received confirmation includes a confirmation from the third-party provider device that the item is available for pickup from the brick-and-mortar location.

17. The computer program product of claim 12, wherein the receiving of the promotion data from the third-party provider device is from a merchant center portal that is configured for access by a plurality of different third-party provider devices, and wherein the third-party provider device is one of the plurality of different third-party provider devices.

18. The computer program product of claim 17, wherein the promotion data received by the third-party provider device are based on marketing data received by the third-party provider device via the merchant center portal.

19. The computer program product of claim 18, wherein the promotion data further comprises target marketing data describing attributes of consumers to be offered the promotion, wherein the target marketing data are derived from the marketing data.

20. The computer program product of claim 17, wherein the confirming of the consumer order data is via the merchant center portal.

21. The computer program product of claim 12, wherein the third-party provider is a national retailer.

22. The computer program product of claim 12, wherein the third-party provider is a point of sale (POS) retailer.

23. A system comprising:
   one or more computers and one or more storage devices storing instructions that are operable, when executed by the one or more computers, to cause the one or more computers to perform operations implementing providing a digital storefront service, the operations comprising:
      retrieving, using a processor and from a repository, data describing available inventory of items at one or more brick-and-mortar locations of a third-party provider of the items, wherein a brick-and-mortar location is a physical location where the items are sold;
      generating, using the processor, an interactive third-party electronic interface configured to facilitate creation of promotion data that defines a potential promotion based on instant inventory decision data provided via the interactive third-party electronic interface;
      transmitting, using the processor, the interactive third-party electronic interface to the third-party provider device;
      transmitting, using the processor, computer-executable instructions to the third-party provider device, the computer-executable instructions configured to provide a visual representation of the items for use in the potential promotion, and the computer-executable instructions further configured to provide a digital storefront portal via the interactive third-party electronic interface to allow creation of the promotion data;
      receiving, using the processor and via the interactive third-party electronic interface of the third-party provider device, the promotion data, wherein the promotion data includes a price and a quantity of an item that is in stock and available for customer pickup at the one or more brick-and-mortar locations of the third-party provider;
      generating, using the processor, an impression of the potential promotion based on the promotion data, the impression being an indication of the potential promotion and configured to enable purchase of the potential promotion, the potential promotion being an indication of a promotional value that upon purchase or acceptance results in issuance of an instrument that is used toward at least a portion of one of a purchase, acquisition, procurement, or consumption of one of goods, services, and experiences defined by the potential promotion;
      obtaining, using the processor, real-time global positioning system (GPS) location data from a plurality of consumer devices;
      monitoring, using the processor, a change in the real-time GPS location data associated with the plurality of consumer devices over a period of time;
      in response to determining, based on the monitoring of the change in the real-time GPS location data, that at least one real-time GPS location for at least one consumer device of the plurality of consumer devices is within a certain distance of at least one brick-and-mortar location from the one or more brick-and-mortar locations, transmitting, using the processor and to the at least one consumer device of a plurality of consumer devices identified based on the real-time GPS location data and a geo-fencing technique, an electronic communication configured to render an interactive promotions electronic interface for the impression, wherein the electronic communication is generated based on the real-time GPS location data and the geo-fencing technique, wherein the interactive promotions electronic interface comprises a first interactive graphic icon associated with the impression configured to initiate generation of a modified version of the interactive promotions electronic interface that comprises at least a portion of the promotion data provided via the interactive third-party electronic interface of the third-party provider device, and wherein the interactive promotions electronic interface comprises a second interactive graphic icon associated with the impression configured to initiate purchase of the item specified by the impression in response to an electronic interface action performed with respect to the second interactive graphic icon;
      receiving, using the processor and in response to the electronic interface action performed with respect to the second interactive graphic icon, consumer order data for the purchase of the item as specified by the impression, wherein the consumer order data includes a selection of one of the brick-and-mortar locations of the third-party for pickup of the item;
      generating instrument data, using the processor that is independent from the third-party provider device, the instrument data describing the item; and
      transmitting, using the processor to the consumer device, the instrument data in response to finalizing a purchase of the item as specified by the impression, and wherein finalizing the purchase of the item comprises:
         executing, using the processor, a purchase transaction using the consumer order data, wherein executing the purchase transaction comprises determining, using the processor, purchase transaction data;

receiving, using the processor, confirmation of the consumer order data from the third-party provider to enable pickup of the item from one of the brick-and-mortar locations;

generating, using the processor, purchase summary content describing the finalized purchase of the item, wherein the purchase summary content comprises pickup location data describing the brick-and-mortar location, the pickup location data comprising at least one of address, contact information, location map, and hours of operation for the brick-and-mortar location; and transmitting, using the processor, the purchase summary content to an electronic interface of the consumer device, wherein the purchase summary content is configured to render a visual representation related to at least one of the address, the contact information, the location map, or the hours of operation for the brick-and-mortar location associated with the item as specified by the impression previously transmitted to the consumer device based on the real-time GPS location data.

24. The system of claim 23, wherein the consumer order data for purchase of the item is selected from a promotion offerings display that is rendered on the consumer device, and wherein the promotion offerings display comprises promotions content.

25. The system of claim 24, wherein the promotions content comprises an icon representing the item being offered for purchase.

26. The system of claim 25, wherein the icon comprises a graphic representing a link to digital content describing the item for purchase as specified by the impression.

27. The system of claim 23, wherein finalizing the purchase of the item further comprises:
transmitting, using the processor, an order confirmation notification to the third-party provider device, wherein the order confirmation notification comprises the brick-and-mortar location for pickup of the item; and
receiving, using the processor, the confirmation of the consumer order data from the third-party provider device, wherein the received confirmation includes a confirmation from the third-party provider device that the item is available for pickup from the brick-and-mortar location.

28. The system of claim 23, wherein the receiving of the promotion data from the third-party provider device is from a merchant center portal that is configured for access by a plurality of different third-party provider devices, and wherein the third-party provider device is one of the plurality of different third-party provider devices.

29. The system of claim 28, wherein the promotion data received by the third-party provider device are based on marketing data received by the third-party provider device via the merchant center portal.

30. The system of claim 29, wherein the promotion data further comprises target marketing data describing attributes of consumers to be offered the promotion, wherein the target marketing data are derived from the marketing data.

31. The system of claim 28, wherein the confirming of the consumer order data is via the merchant center portal.

32. The system of claim 23, wherein the third-party provider is a national retailer.

33. The system of claim 23, wherein the third-party provider is a point of sale (POS) retailer.

* * * * *